Figure 1:
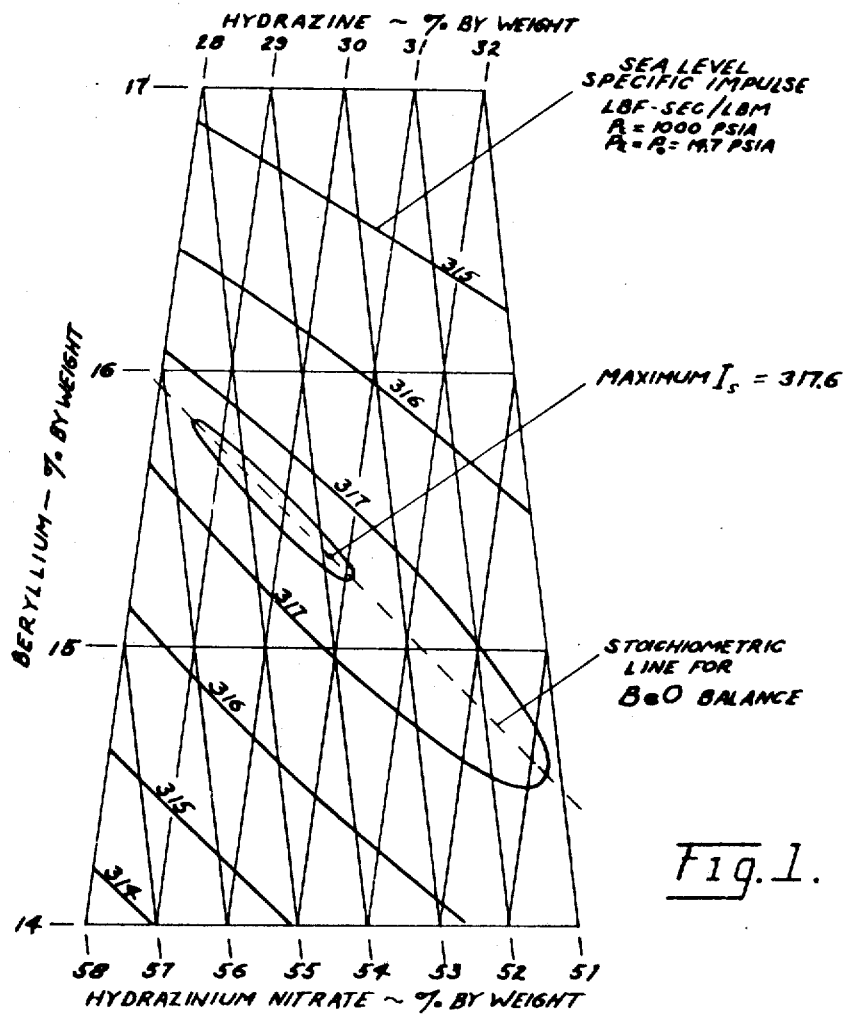

United States Patent [19]

Bridgeforth, Jr. et al.

[11] 3,861,138

[45] Jan. 21, 1975

[54] METHOD OF PROPULSION USING STABLE, HIGH ENERGY COMPOSITIONS WITH HYDRAZINE CONTAINING WORKING FLUID

[75] Inventors: Robert M. Bridgeforth, Jr., Mercer Island; George S. Sutherland, Seattle, both of Wash.

[73] Assignee: Explosives Corporation of America, Issaquah, Wash.

[22] Filed: Jan. 27, 1964

[21] Appl. No.: 340,127

[52] U.S. Cl. .................. 60/217, 44/7 B, 44/7 D, 149/36, 149/43, 149/114, 60/216
[51] Int. Cl. ............................................. C06d 5/10
[58] Field of Search ......... 60/35.4, 217; 149/36, 43; 44/7 B, 7 D

[56] References Cited
UNITED STATES PATENTS

| | | | |
|---|---|---|---|
| 2,943,927 | 7/1960 | Audneth et al. | 149/36 |
| 2,978,864 | 4/1961 | Stengel | 149/36 X |
| 3,088,272 | 5/1963 | Stengel et al. | 60/35.4 |

*Primary Examiner*—Benjamin R. Padgett
*Attorney, Agent, or Firm*—Graybeal, Cole & Barnard

[57] ABSTRACT

The present invention relates to stable, high energy compositions for utilization as monopropellants in reaction engines or as explosives, depending upon proportionation of ingredients. More particularly, the present invention relates to preferably thixotropic compositions comprising a particulate metal fuel and hydrazinium nitrate as an oxidizer, coupled with one or more working fluid and desensitizer ingredients, providing high performance and high bulk density with very good physical and chemical stability. Specifically, high energy reaction systems according to the invention utilize beryllium, aluminum, and mixtures thereof as the metal fuel contributing constituent, utilize hydrazinium nitrate as the oxidizer contributing constituent, and utilize as the working fluid and desensitizer a hydrazine containing material with one or more ingredients selected from the group consisting of hydrazine, monomethylhydrazine, unsymmetrical dimethylhydrazine, and mixtures thereof with water.

34 Claims, 2 Drawing Figures

METHOD OF PROPULSION USING STABLE, HIGH ENERGY COMPOSITIONS WITH HYDRAZINE CONTAINING WORKING FLUID

Reaction systems involving monopropellant compositions are known to have inherent advantages as compared with bipropellant reaction systems in terms of ease of storage and handling, and in terms of greater simplicity of propellant delivering pumps, feed systems and injector components and the like. However, prior monopropellant compositions have proven to be either low in propulsion performance or so sensitive to shock detonation as to be dangerous to handle and use. In contrast, propellant compositions of the present invention combine high performance (up to about 318 seconds sea level specific impulse) with very good chemical stability and insensitivity to shock, many of the formulations characteristic of the invention being incapable of detonation. By realizing an inherent stability in terms of relative insensitivity to shock detonation, compositions of the present invention used as monopropellents can minimize and in many cases eliminate the elaborate detonation safeguards normally required when using prior high performance monopropellants.

It is a further advantage and feature of certain compositions according to the present invention that such are bi-phase, thixotropic mixtures, the compositions in this respect having present therein the metallic fuel in finely divided, solid state and having the oxidizer contributing constituent and working fluid present in liquid phase, the mixture further comprising a gelling agent giving to the composition the properties of a semi-solid insofar as storing and handling characteristics, the compositions nonetheless being pumpable and therefore compatible with known handling techniques for gelated propellants. However, in contrast to most gelated monopropellants, wherein the fuel and oxidizer are present and thoroughly intermixed in the same phase (i.e., liquid) only the surfaces of the solid phase fuel particles are exposed to the liquid phase oxidizer in the thixotropic compositions of the present invention. There is thus better segregation of the fuel and oxidizer than is the case in a monophase fuel-oxidizer mixture, and the insensitivity to shock is consequently substantially improved.

Yet another advantage of compositions of the present invention when used as reaction engine propellants is that such compositions are compatible with most common materials employed in fabrication of reaction engine components.

Yet a further feature and advantage of compositions of the present invention is that formulations thereof compounded for use as explosives are not hypersensitive to shock yet provide very high power performance, producing more gas per unit mass than the conventional aluminum-ammonium nitrate explosive reaction. Certain typical explosive formulations thereof attain the highest performance of any known explosives, based on the Trauzl Block Test.

These and other objects, features, advantages and characteristics of compositions according to the present invention will be apparent from the following illustrative examples and discussion thereof.

Figure 2:
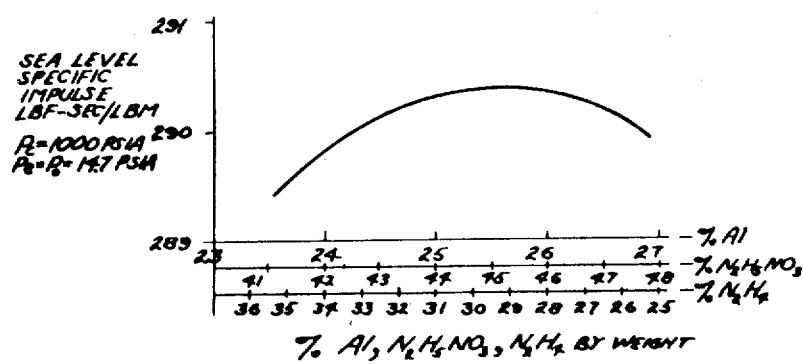

In the accompanying illustrations:

FIG. 1 graphically presents sea level specific impulse data at and near optimum for the reaction system composed of beryllium, hydrazinium nitrate, and hydrazine; and FIG. 2 graphically presents sea level specific impulse data at and near optimum for the reaction system composed of aluminum, hydrazinium nitrate, and hydrazine.

EXAMPLE 1

As a first example of a propellant composition according to the present invention, the optimum formulation presented at FIG. 1 was selected, wherein the composition consists of the following ingredients, by weight:

| | |
|---|---|
| Be | 15.32% |
| $N_2H_5NO_3$ | 53.91% |
| $N_2H_4$ | 30.77% |

Evaluation of this composition indicates that under operating conditions involving a chamber pressure of 1,000 psia and an exit pressure of 14.7 psia, the theoretical sea level specific impulse (with shifting equilibrium) is about 318 lbf-sec/lbm, and the composition has a bulk density of 0.051 lbm/in$^3$. Further evaluation of this system indicates that the vacuum specific impulse with an exhaust nozzle area ratio of 40 is approximately 375 lbf-sec/lbm.

EXAMPLE 2

To illustrate formulation of the reaction and working fluid ingredients of the composition with a gelling agent, the composition of Example 1 was mixed with 3 percent colloidal silica, with the resulting composition being readily pumpable with an injector pressure drop of about 100 psi. Shock sensitivity tests of this composition indicate that the shock sensitivity is 15–20 Kg-cm, based on standard JANAF drop-weight test procedure. Storage tests indicate the composition to be compatible; no pressure buildup was observed in a closed sample during four week's storage under standard conditions. Theoretical sea level specific impulse of this thixotropic composition is evaluated at about 315 lbf-sec/lbm.

EXAMPLE 3

To show the effect of addition of water to the system presented in Example 1, the system investigated in Example 2 was composed of the following ingredients by weight:

| | |
|---|---|
| Be | 17% |
| $N_2H_5NO_3$ | 18% |
| $N_2H_4$ | 40% |
| $H_2O$ | 25% |

Evaluation indicated very little loss in theoretical performance providing a sea level specific impulse of about 310 lbf-sec/lbm.

EXAMPLE 4

To illustrate formulation of the reactants and working fluid and desensitizer ingredient of the composition presented in Example 3 with a gelling agent, this composition was evaluated in admixture with 6 percent by weight of colloidal silica. The shock sensitivity of this thixotropic composition was in excess of 120 kg-cm according to standard JANAF drop-weight test procedure, the shock insensitivity of this composition being markedly greater than that of the composition of Example 2, due to the water content of the composition. This composition also proved to be fully compatible under the storage test conditions set forth in Example 2.

EXAMPLE 5

To illustrate another composition according to the invention, involving a hydrazine-rich mix (i.e., excess working fluid and desensitizer), the following composition was formulated, with proportions by weight:

| | |
|---|---|
| Be | 10% |
| $N_2H_5NO_3$ | 34% |
| $N_2H_4$ | 56% |

Estimated sea level theoretical specific impulse was evaluated at 300 lbf-sec/lbm. This composition, compounded with 3 percent colloidal silica by weight exhibited a shock sensitivity of greater than 120 kg-cm, and the thixotropic composition proved to be fully compatible upon four week's storage of a closed sample. The superior shock insensitivity of this composition, as compared with that of Example 2, is attributed to the excess hydrazine.

EXAMPLE 6

To illustrate utilization of another hydrazine containing working fluid in a system according to the invention, the following formulation was prepared, with proportions by weight:

| | |
|---|---|
| Be | 15.32% |
| $N_2H_5NO_3$ | 52.91% |
| $CH_3N_2H_3$ | 30.77% |

Estimated theoretical specific impulse under sea level conditions as set forth in Example 1 was evaluated at 308 lbf-sec/lbm. A thixotropic composition (with 3 percent colloidal silica by weight added) showed a shock sensitivity of 15–20 kg-cm, and the composition was fully compatible under the storage conditions detailed in Example 2.

EXAMPLE 7

A further formulation according to the invention was evaluated, wherein a like proportion of unsymmetrical dimethyl hydrazine was substituted for the monomethylhydrazine working fluid of the composition set forth in Example 6, with like performance characteristics.

Substitution of monomethylhydrazine or unsymmetrical dimethylhydrazine for the hydrazine as the working fluid in general involves a decrease in theoretical sea level specific performance of about 9–15 seconds.

EXAMPLE 8

To illustrate a typical and optimized composition utilizing aluminum as the metallic fuel constituent, the following composition was formulated on the basis of the data presented at FIG. 2, with proportions by weight:

| | |
|---|---|
| Al | 25.4% |
| $N_2H_5NO_3$ | 44.8% |
| $N_2H_4$ | 29.8% |

Evaluation indicated that a maximum sea level specific impulse at a chamber pressure of 1,000 psia and an exit pressure of 14.7 psia for this composition is about 290 lbf-sec/lbm (again note FIG. 2) and that the bulk density of the composition is 0.055 lbm/in³. A somewhat different mix characterizing this three component system was tested as to sensitivity and compatibility, with the following proportions by weight:

| | |
|---|---|
| Al | 15.32% |
| $N_2H_5NO_3$ | 53.91% |
| $N_2H_4$ | 30.77% |

This composition, compounded with 3 percent by weight of colloidal silica, demonstrated a shock sensitivity of 15–20 kg-cm, and full compatibility under the test storage conditions specified in Example 2.

EXAMPLE 9

To illustrate the utilization of an aluminum-hydrazine nitrate-hydrazine system with additional water to reduce sensitivity to shock, the following formulation with proportions by weight was evaluated:

| | |
|---|---|
| Al | 17% |
| $N_2H_5NO_3$ | 18% |
| $N_2H_4$ | 40% |
| $H_2O$ | 24% |
| $(NH_4)_2Cr_2O_7$ | 1% |

Upon compounding with 3% colloidal silica, the shock sensitivity on test proved to be in excess of 120 kg-cm and the compatibility of the mix was sufficient to permit usage thereof under conditions involving short-to-intermediate storage times (ammonium dichromate being added in the above formulation to inhibit aluminum-water reactivity and improve compatibility).

EXAMPLE 10

A formulation was evaluated involving the same proportionation as in Example 6 except that an equal weight of aluminum was substituted for the beryllium as the fuel constituent. Upon compounding with 3 percent colloidal silica, the shock sensitivity characteristics of the mix under the drop weight test procedure specified above was 110–120 kg-cm, and the composition proved to be fully compatible under the above specified storage conditions.

EXAMPLE 11

A further formulation was evaluated, involving the ingredients in the proportions specified in Example 5, with aluminum being substituted for the beryllium as the fuel constituent. The thixotropic composition proved to have a shock sensitivity in excess of 120 kg-cm and to be fully compatible under the test storage conditions specified.

EXAMPLE 12

A typical example of a composition formulation for use as an explosive is as follows:

| | |
|---|---|
| Al | 29% |
| $N_2H_5NO_3$ | 51.3% |
| $N_2H_4$ | 19.7% |

Theoretical calculations indicate the following performance data for the above composition, in comparison with known comparable explosive systems:

| | Vol gas cc/gram | Heat cal/gm | Vol × Ht 1000 (Figure of Merit) |
|---|---|---|---|
| Al–$N_2H_5NO_3$–$N_2H_4$ of Ex. 12 | 1100 | 1800 | 1980 |
| Al–$NH_4NO_3$ | 550 | 2350 | 1290 |
| Blasting gelatine | 851 | 1422 | 1210 |
| Nitroglycerin | 721 | 1580 | 1124 |

| | —Continued | | |
|---|---|---|---|
| NH₄NO₃ + sawdust | 1025 | 882 | 904 |
| TNT | 730 | 925 | 675 |
| Gunpowder | 386 | 574 | 228 |

As will be noted, the Figure of Merit (a measure of the power produced) is markedly higher for the $Al$-$N_2H_5NO_3$-$N_2H_4$ explosive system than for the other explosive systems.

Comparative Trauzl Block Tests produced the following results:

| | Volume Difference (cc) |
|---|---|
| $Al$—$N_2H_5NO_3$—$N_2H_4$ of Ex. 12 | 690 |
| Nitroglycerin | 550 |
| TNT | 295 |
| 40% dynamite | 260 |

Other explosive composition formulations characteristic of the invention are as follows, the mix in each case being compounded with about 3 percent by weight of a gelling agent:

| Example 13: | | |
|---|---|---|
| | $Al$ | 21.7% |
| | $N_2H_5NO_3$ | 38.3% |
| | $N_2H_4$ | 40% |
| EXAMPLE 14: | $Al$ | 32.6% |
| | $N_2H_5NO_3$ | 57.4% |
| | $N_2H_4$ | 10% |
| EXAMPLE 15: | $Be$ | 17% |
| | $N_2H_5NO_3$ | 60% |
| | $N_2H_4$ | 23% |
| EXAMPLE 16: | $Be$ | 17% |
| | $N_2H_5NO_3$ | 64% |
| | $N_2H_4$ | 16% |
| | $H_2O$ | 3% |

Our analyses and experimentations have indicated that the reducer and oxidizer constituents should be in essentially stoichiometric proportion for optimum performance, but that the proportionation may be varied substantially from stoichiometric optimum, if desired to improve other characteristics, such as sensitivity. Thus, the proportionation of the hydrazinium nitrate to the metal reducer constituent should be at least about 3.5:1 in the case where beryllium is the reducer constituent and should be at least about 1.76:1 in the case where aluminum is the reducer constituent and, in general, higher proportions of hydrazinium nitrate are to be employed in explosive formulations, as compared with propellant formulations, unless a relatively large proportion of desensitizer is used in the propellant formulation. With respect to the relative proportion of gelling agent, sufficient gelling agent is to be used to render the composition thixotropic and pumpable, with only sufficient gelling agent being employed to effect this condition, since excess gelling agent detracts from the performance characteristics of the composition in that it is a diluent insofar as the energy producing reaction is concerned. In general, it has been found that the proportion of gelling agent for these purposes should be from about 3 percent to about 6 percent of the total weight of the thixotropic composition.

Gelling agents other than colloidal silica can be employed, such as acetylene black, carboxymethylcellulose, cellulose acetate, and mixtures thereof, for example.

Ignition of propellant compositions according to the present invention can be accomplished by known techniques such as use of a pyrotechnic squib, or by injection of a small amount of hypergolic material such as red fuming nitric acid or chlorine trifluoride. Ignition characteristics, in the case where the metallic fuel constituent is beryllium, can also be improved by admixture with the composition of relatively small amounts (e.g. less than about 5 percent by weight relative to the weight of the beryllium) of aluminum particles and/or magnesium particles, the relatively more ignitable fuel particles serving in the mix as dispersed ignition points which upon reaction in turn ignite the interspersed beryllium particles. Explosive compositions according to the invention are detonatable by known techniques, such as by use of standard commercial blasting caps.

The particulate fuel constituent should have a particle size of less than about 40 microns and preferably about 10–20 microns.

Compositions of the present invention, while intended primarily for usage as monopropellants and as explosives without addition of other reactants, can by appropriate stoichometric compensation be used as either a fuel-rich or an oxidizer-rich ingredient in a bipropellant propulsion reaction, or in admixture with other explosive ingredients, in the case of an explosive application.

From the foregoing, further equivalent variations of the invention as to typical formulations, as to modes of application, and as to reaction environments will be apparent to those skilled in the art to which the invention is addressed, within the scope of the following claims.

What is claimed is:

1. A stable, high energy composition for use as a propellant or as an explosive, said composition principally comprising:
   a. as a reducing reactant, finely divided metal selected from the group consisting of aluminum, beryllium, and mixtures thereof;
   b. as an oxidizing reactant, hydrazinium nitrate; and
   c. a hydrazine containing working fluid.

2. The composition of claim 1, wherein the proportionation by weight of the hydrazinium nitrate to the reducing reactant is at least about 3.5:1 in the case where beryllium is the reducing reactant and is at least about 1.76:1 in the case where aluminum is the reducing reactant, and the percent by weight of the hydrazine containing working fluid is from about 20 percent to about 65 percent.

3. The composition of claim 1, wherein the reducing reactant and the oxidizing reactant are present in substantially stoichiometric relative proportions.

4. The composition of claim 1, wherein the reducing reactant essentially comprises beryllium.

5. The composition of claim 1, wherein the reducing reactant essentially comprises aluminum.

6. The composition of claim 1, wherein the finely divided reducing reactant has an average particle size of less than about 40 microns.

7. The composition of claim 1, wherein the hydrazine containing working fluid principally comprises one or more ingredients selected from the group consisting of hydrazine, monomethylhydrazine, unsymmetrical dimethylhydrazine, and mixtures thereof with water.

8. The composition of claim 7, wherein said working fluid principally comprises hydrazine.

9. The composition of claim 7, wherein said working fluid principally comprises hydrazine and water.

10. The composition of claim 9, comprising from about 20 percent to about 40 percent by weight of hydrazine and up to about 25 percent by weight of water.

11. A stable, high energy composition suitable for use as a rocket monopropellant or as an explosive depending upon proportionation, said composition principally comprising;
   a. as a fuel contributing constituent, finely divided metal selected from the group consisting of aluminum, beryllium, and mixtures thereof;
   b. hydrazinium nitrate as an oxidizer contributing constituent;
   c. a hydrazine containing working fluid and densensitizer, the said working fluid and desensitizer being present in an amount to efficiently convert a substantial portion of the thermal energy of the fuel-oxidizer reaction into kinetic energy in the case of a propellant or into work in the case of an explosive; and
   d. a gelling agent present in sufficient quantity to form a pumpable thixotropic gel in which the oxidizer contributing constituent and the working fluid contributing constituent are uniformly dispersed in liquid phase and the fuel contributing constituent is present in the form of substantially uniformly distributed solid particles.

12. The composition of claim 11, wherein the proportionation by weight of the hydrazinium nitrate to the fuel contributing constituent is at least about 3.5:1 in the case where beryllium is the fuel and is at least about 1.76:1 in the case where aluminum is the fuel, and the percent by weight of the hydrazine containing working fluid and desensitizer is from about 20 percent to about 65 percent.

13. The composition of claim 11, wherein the fuel contributing constituent and the oxidizer contributing constituent are present in substantially stoichiometric relative proportions.

14. The composition of claim 11, wherein the fuel contributing constituent essentially comprises beryllium.

15. The composition of claim 11, wherein the fuel contributing constituent essentially comprises aluminum.

16. The composition of claim 11, wherein the finely divided fuel contributing constituent has an average particle size of less than about 40 microns.

17. The composition of claim 11, wherein the hydrazine containing working fluid and desensitizer principally comprises one or more ingredients selected from the group consisting of hydrazine, monomethylhydrazine, unsymmetrical dimethylhydrazine, and mixtures thereof with water.

18. The composition of claim 17, wherein said working fluid and desensitizer principally comprises hdrazine.

19. The composition of claim 17, wherein said working fluid and desensitizer principally comprises hydrazine and water.

20. The composition of claim 19, comprising from about 20 percent to about 40 percent by weight of hydrazine and up to about 25 percent by weight of water.

21. The composition of claim 11, wherein the gelling agent is present in an amount within a range of about 3-6 percent by weight of the composition.

22. The composition of claim 11, wherein the gelling agent is selected from the group consisting of colloidal silica, acetylene black, carboxymethylcellulose, cellulose acetate, and mixtures thereof.

23. The composition of claim 11, wherein the gelling agent is colloidal silica.

24. A high energy composition wherein the energy producing constituents consist essentially of the following, in the indicated relative proportions:
   a. finely divided beryllium as a reducer constituent, present in the amount of about 15 percent by weight;
   b. hydrazinium nitrate as an oxidizer constituent, present in the amount of about 54 percent by weight; and
   c. hydrazine as a working fluid, present in the amount of about 31 percent by weight.

25. A high energy composition wherein the energy producing constituents consist essentially of the following, in the indicated relative proportions:
   a. finely divided beryllium as a reducer constituent, present in the amount of about 17 percent by weight;
   hydrazinium nitrate as an oxidizer constituent, present in the amount of about 18 percent by weight; and
   c. a working fluid and desensitizer, consisting essentially of hydrazine present in the amount of about 40 percent by weight and water present in the amount of about 25 percent by weight.

26. A high energy composition wherein the energy producing constituents consist essentially of the following, in the indicated relative proportions:
   a. finely divided aluminum as a reducer constituent, present in the amount of about 25 percent by weight;
   b. hydrazinium nitrate as an oxidizer constituent, present in the amount of about 45 percent by weight; and
   c. hydrazine as a working fluid, present in the amount of about 30 percent by weight.

27. A high energy composition wherein the energy producing constituents consist essentially of the following, in the indicated relative proportions:
   a. finely divided aluminum as a reducer constituent, present in the amount of about 17 percent by weight;
   b. hydrazinium nitrate as an oxidizer constituent, present in the amount of about 18 percent by weight; and
   c. a working fluid and desensitizer, consisting essentially of hydrazine present in the amount of about 40 percent by weight and water present in the amount of about 24 percent by weight.

28. The composition of claim 27, further comprising up to about 1 percent of a compound inhibiting aluminum-water reactivity during storage of the composition.

29. The composition of claim 28, wherein the compound inhibiting aluminum-water reactivity is ammonium dichromate.

30. The method of producing reaction thrust, comprising: chemically reacting in a reaction motor a fuel constituent selected from the group consisting of beryllium, aluminum and mixtures thereof and an oxidizer constituent consisting essentially of hydrazinium nitrate, the reaction occurring in the presence of an amount of hydrazine containing working fluid effective to convert a considerable portion of the thermal heat of reaction to kinetic energy; and discharging the working fluid and reaction products from the exhaust nozzle of the reaction motor to produce thrust.

31. The method of claim 30, wherein said fuel constituent consists essentially of beryllium.

32. The method of claim 30, wherein said fuel constituent consists essentially of aluminum.

33. The method of claim 30, wherein said hydrazine containing working fluid consists essentially of hydrazine.

34. The method of claim 30, wherein said hydrazine containing working fluid comprises hydrazine and water.

* * * * *